S. HARDMAN.
APPARATUS FOR PROVIDING ALUM SOLUTION FOR PAPER MAKERS' USE.
APPLICATION FILED JAN. 27, 1909.
979,482.
Patented Dec. 27, 1910.
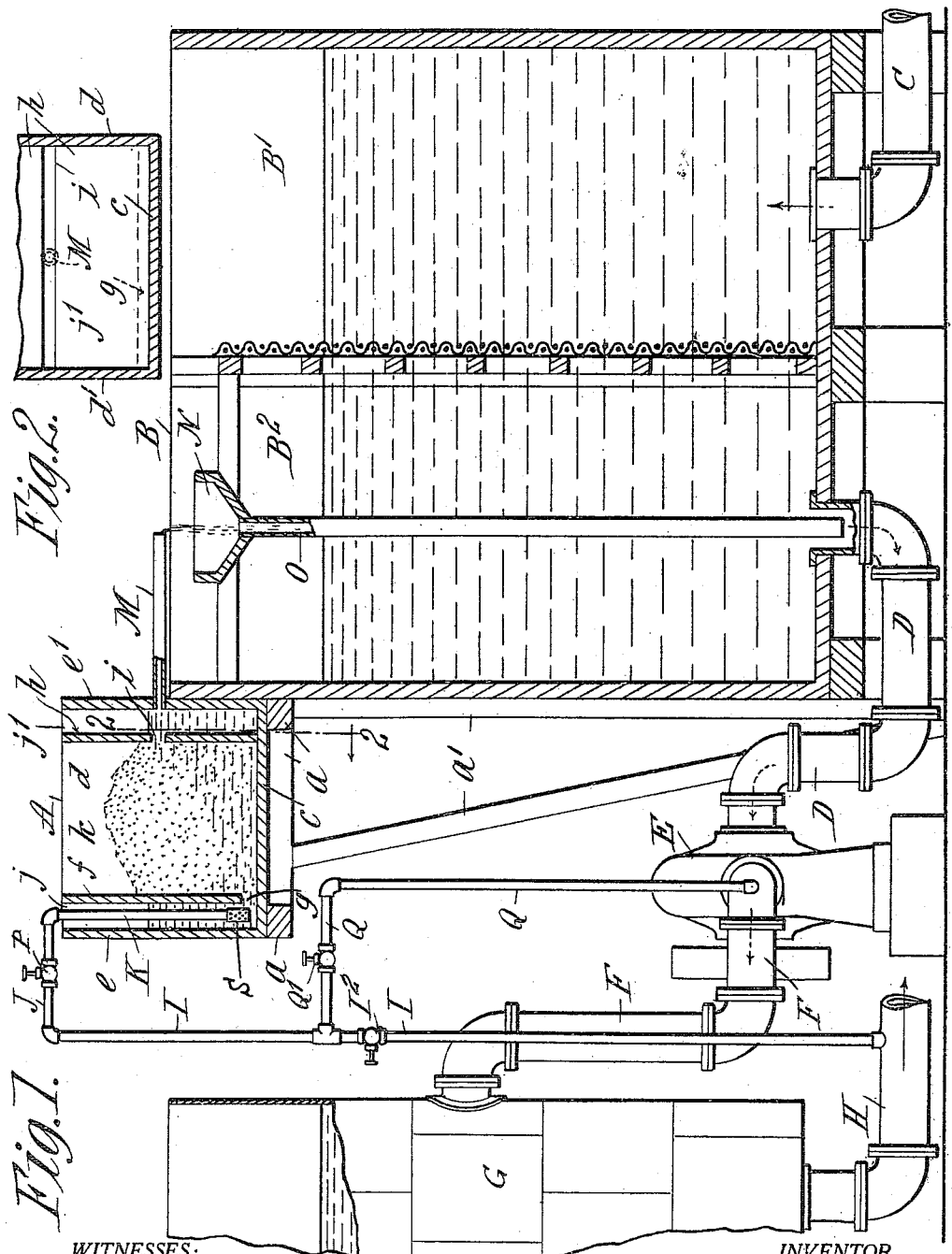
WITNESSES:
INVENTOR.
Samuel Hardman,
BY
ATTORNEY.

UNITED STATES PATENT OFFICE.

SAMUEL HARDMAN, OF HOLYOKE, MASSACHUSETTS.

APPARATUS FOR PROVIDING ALUM SOLUTION FOR PAPER-MAKERS' USE.

979,482.  Specification of Letters Patent.  Patented Dec. 27, 1910.

Application filed January 27, 1909. Serial No. 474,614.

*To all whom it may concern:*

Be it known that I, SAMUEL HARDMAN, a citizen of the United States of America, and resident of Holyoke, in the county of Hampden and State of Massachusetts, have invented certain new and useful Improvements in Apparatuses for Providing Alum Solution for Paper-Makers' Use, of which the following is a full, clear, and exact description.

This invention relates to an apparatus for producing and delivering a solution of alum for admixture with water preparatory to the filtering of the latter for use in paper manufacture,—a supplying of alum to water, as well known in the art, being commonly done especially where the water contains more or less impurities for the purpose of coagulating the foreign substances and assuring that the water supplied from the filter for making paper is clean and pure and devoid of any elements which would tend to cause a discoloration of the paper.

The invention consists in the apparatus hereinafter described in conjunction with the accompanying drawings and set forth in the claims.

In the drawings:—Figure 1 is a side elevation, partly in section, of an alum mixing tank shown in connection with a screen-box, circulating pump, and a portion of a filter; Fig. 2 is a cross section of the lower portion of the alum mixing tank taken on line 2—2, Fig. 1.

In the drawings, A is the alum-mixing tank, and is shown as attached to one side of the screen box B. The tank A is supported by the sill-frame $a$ and the upright braces $a'$, the lower end portions of the latter resting on the flooring. The mixing tank A, which is rectangular in shape, is preferably constructed of wood and comprises the bottom $c$, side-walls $d$ and $d'$, and end walls $e$ and $e'$, the top being open.

Adjacent the end wall $e$ and extending transversely across the tank A is the partition wall $f$, the end portions of which are joined, water tight, to the end walls $d$ and $d'$. This portion $f$ extends vertically from the top of the tank A to a point slightly above the bottom wall $c$; the narrow slit $g$ thus formed between the bottom edge of the partition $f$ and the tank bottom $c$ extends transversely the entire width of the tank and is preferably about one inch high through which the water enters into the compartment, which contains the alum, and comes in contact with the alum, the full width of the tank. By this arrangement, a strong alum solution is obtained which would not be the case, if the water entered the chamber at one point, as it would dissolve a passage through to the place of exit, and prevent the obtaining of a regular alum solution. At the opposite end of tank A and adjacent end wall $e'$ is a partition wall $h$ which extends transversely across the tank, and its end portions are also united so as to be water-tight to the side walls $d$ and $d'$. This partition $h$ extends from the top to the bottom of the tank. A transversely extending slit $i$ is formed midway of the height of partition $h$, and extends the entire width of the tank A. In practice, this slit is preferably formed about one inch in height.

The narrow spaces or compartments $j$ and $j'$ formed between the end-walls $e$ and $e'$, and the partition walls $f$ and $h$ respectively, are separated by the wide compartment $k$ into which the alum, represented by $x$, in dry bulk-form is supplied, as indicated in Fig. 1.

The water (preferably filtered) which is admitted into the alum compartment $k$ is first received in compartment $j$, and is delivered from the said compartment $j$ into the alum compartment $k$ through the transverse passage or slit $g$ and is distributed evenly to the alum, the entire width of the compartment and it works its way upward through the alum to the level of the outlet slit $i$ in partition $h$.

The amount of alum usually supplied in compartment $k$ is about the proportion indicated in stipple in Fig. 1, *i. e.* the compartment is kept nearly filled, and the water passing through it as supplied from compartment $j$ is delivered therefrom slowly to the end that as it passes out through the slot $i$ and into compartment $j'$ it takes up in solution a large percentage of alum, preferably as near a saturated solution as possible consistent with a required delivery.

The construction and operation of the alum mixing tank A having now been described, a further description of its operation in connection with the water supply and filters will now be briefly given. The water-supply usually obtained in paper mills is from a canal or reservoir and enters the mill through an inlet pipe C, and thence into a compartment B' of a large screen box B, from which it passes through a suitable screen and grating to the compartment B² from which it is drawn by the suction pipe D of a pump E and discharged therefrom through the pipe F into the filters, a portion of one being shown at G. The filtered water is then taken through a pipe H to a pump (not shown) which delivers it to various parts of the paper mill.

The water supply for the alum mixing tank A as shown in the drawings in Fig. 1, is taken from the pump-connected filter discharge-pipe H, through a vertical pipe I; as I prefer to use filtered water for the alum mixture, and because there is usually sufficient pressure within the pipe H to insure the delivery of the water at the top of the tank A. The upper end portion of the pipe I, which is slightly above the top edge of the tank A connects with a short horizontal pipe J, which extends therefrom to a point over the central portion of the compartment $j$ of tank A, and is continued downward from this point by a vertical pipe K to a point adjacent the bottom of the said compartment.

An outlet pipe M for the alum saturated water leads from a central part of the compartment $j'$ through the end wall $e'$ and terminates at a point about midway over the screen box compartment B² and directly over the outlet or suction pipe D.

At a point beneath the outlet end of pipe M and adjacent thereto is supported a funnel N from which a vertical pipe O leads downwardly and has its outlet end positioned within the suction pipe D to the end that as the pump E draws off the contents of the compartment B² and forces it into the filter G, the alum solution coming down through the funnel pipe O being carried directly to the filter G.

An important adjunct of the above described means for supplying an alum mixture to the filtered water as described is the controlling valve P which is located in the short pipe-connection J, and by means of which more or less alum mixture may be sent into the filters according to the degree of opening of the said valve, it being understood that the overflow and discharge through pipe M is as slow or as rapid as the intake from the pipe K.

A provision for taking unfiltered water directly from the pump discharge pipe F at times when the filters (which are comparatively slow in delivery) are not supplying enough water, is provided by the branch pipes Q, which connect with the pipe I.

A valve Q' in the pipe Q, and a valve I² in pipe I below the point of junction of the pipes Q and I provide convenient means for quickly shifting from one source of supply to the other, as will be readily understood by a reference to Fig. 1.

A perforated screen cap S is supplied on the discharge end of pipe K, which prevents impurities from screened, but not filtered, water from passing to the alum compartment.

I claim:—

1. In an apparatus of the character described, a receptacle comprising an intermediate compartment for alum, a compartment at one side thereof for receiving water and having at the lower portion thereof communication with the intermediate compartment extending the full width of said intermediate compartment, and another compartment at the opposite side of the alum compartment and having a communication extending the entire width of the alum compartment above the bottom thereof, a filter, a reservoir for unfiltered water, a conduit leading from the reservoir to the filter, a pipe for delivering the water into the water receiving compartment having a connection with both the filter and the reservoir and filter connecting conduit and means for closing the communication respectively between said pipe and filter and between said pipe and the conduit and a pipe leading from the alum solution compartment and delivering it within the reservoir.

2. In an apparatus of the character described, a rectangular mixing tank provided at one side with a partition extending the entire width of said mixing tank and terminating a short distance above the bottom of the mixing tank, forming a water receiving compartment in one side of the mixing tank having a communication the entire width of the mixing tank, a partition wall secured in the opposite end of the mixing tank having a communication intermediate its depth forming an alum solution compartment, a water receiving receptacle having a suitable screen secured therein, means for drawing the water out of said water receiving receptacle and means for supplying the water to the receiving compartment of the mixing tank with water and means for discharging the alum solution at the mouth of the withdrawing means of the water receiving receptacle.

3. In an apparatus of the character described, a receptacle comprising an intermediate compartment for alum, a water receiving compartment at one side thereof having at its lower portion communication extending the full width of said compartment with the alum compartment, and an alum solution compartment at the opposite side of the alum compartment and having communication with the alum compartment intermediate the depth thereof, a filter, a reservoir for filtered water, a conduit leading from the reservoir to the filter, a pipe for delivering the water into the water receiving compartment having a connection with both the filter and the reservoir and the filter connecting conduit, cocks for establishing and closing the communication respectively between said pipe and conduit, and means for delivering the alum solution within the reservoir at the mouth of the conduit leading from the reservoir to the filter.

4. In an apparatus of the character described, a receptacle comprising an intermediate compartment for alum, a water receiving compartment at one side thereof having at its lower portion thereof communication extending transversely the entire width of said compartment with said alum compartment and an alum solution compartment at the opposite side of the alum compartment having communication extending transversely the entire width of said compartment intermediate the top and bottom thereof, a filter, a reservoir for filtered water, a conduit leading from the reservoir to the filter, a pipe for delivering the water into the filter, a pipe for delivering the water into the water receiving compartment having connection with the filter, a funnel provided with a downwardly disposed pipe secured in the reservoir, said downwardly disposed pipe terminating in the conduit leading from the reservoir to the filter whereby said alum solution is delivered into said conduit.

5. In an apparatus of the character described, a receptacle comprising a compartment for alum, a water receiving compartment at one side thereof having at its lower portion communication with said alum compartment extending transversely the width of said alum compartment and an alum solution compartment at the opposite side of the one for alum, having a communication extending transversely the said alum solution compartment above the bottom thereof, a reservoir, a filter, a conduit leading from said reservoir to said filter, means for supplying water to the water receiving compartment, and means for delivering the alum solution at the mouth of the conduit leading from said reservoir to the filter, comprising a funnel having a downwardly disposed pipe suitably secured in said reservoir and terminating within the mouth of the conduit.

Signed by me at Springfield, Mass., in presence of two subscribing witnesses.

SAMUEL HARDMAN.

Witnesses:
BETSY HARDMAN,
WM. S. BELLOWS.